March 17, 1959 H. RADESTOCK 2,877,576
SCOOP WHEEL
Filed March 7, 1956
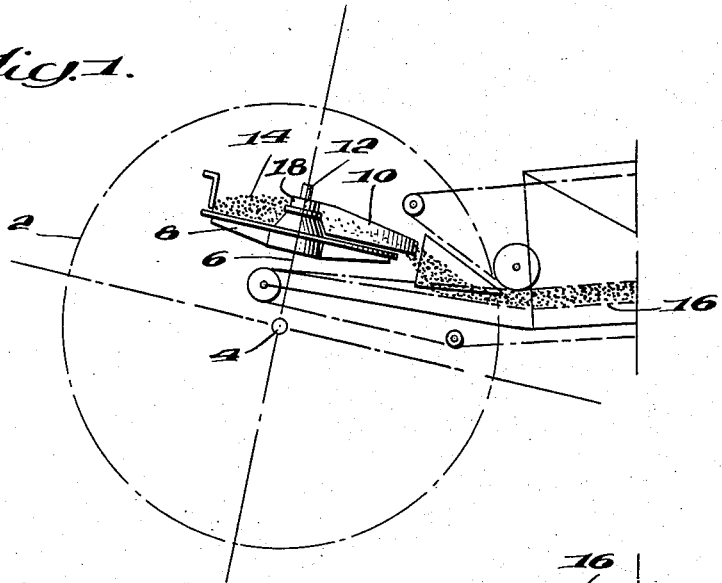
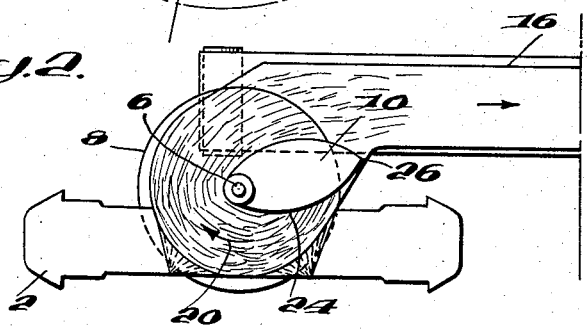
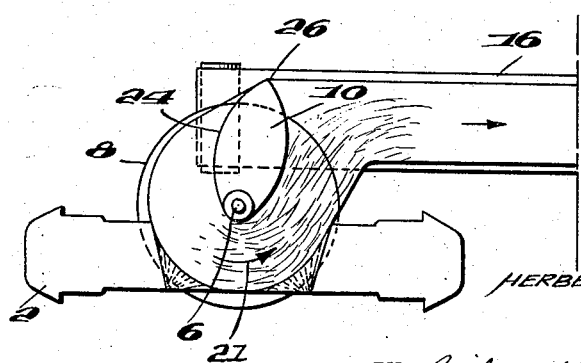
INVENTOR
HERBERT RADESTOCK,
BY
ATTORNEYS

United States Patent Office 2,877,576
Patented Mar. 17, 1959

2,877,576

SCOOP WHEEL

Herbert Radestock, Lubeck, Germany, assignor to Orenstein-Koppel und Lubeckes Maschinenbau Aktiengesellschaft, Lubeck, Germany Application March 7, 1956, Serial No. 570,088

1 Claim. (Cl. 37—190)

This invention relates to scoop wheels for excavating machines or other material handling apparatus. In particular, the invention is directed to a scraper blade for a scoop wheel.

In the copending application of Rasper et al., Serial No. 507,659 filed 11 May 1955 for "Scoop Wheel," an apparatus is disclosed in which the material picked up by the scoop on the periphery of the wheel is deposited on a rotating disk which transfers the material from the scoop wheel onto a belt conveyor. The material on the transfer or discharge disk is removed by means of a scraper mounted above the disk and supported by the shaft forming the axis of the disk.

The objects of the instant invention are to improve upon the means of mounting the scraper, and to give the scraper a shape so that material can be transferred from the disk with the least possible friction.

In general, the objects are obtained by swivel mounting the scraper on the shaft forming the axis for the disk, which shaft extends above the upper surface of the disk. Thus only one scraper is needed for being fitted into various positions in accordance with the particular scoop wheel working conditions. The scraper can be adjusted into operating position for either direction of disk rotation.

The scraper has side walls made of wear and abrasion resistant material. The side walls are curved so that the scraper has a generally oval streamline shape. The curvature of the side walls is in accordance with a logarithmic curve so that the material on the disk hits all points of the side walls at substantially identical angles. Therefore, the material on the disk will be deflected toward the conveyor belt with the least possible friction.

The means by which the objects of the invention are obtained are schematically shown in the accompanying drawings, in which:

Figure 1 is a side elevational view of the disk and scraper with the attendant scoop wheel and conveyor belt mechanism schematically shown;

Figure 2 is a plan view of Figure 1 showing the scraper in one position; and

Figure 3 is a similar view showing the scraper in another position.

The scoop wheel 2 is mounted on the axle 4 which in turn drives shaft 6 which supports and rotates reversible transfer or discharge disk 8. Shaft 6 extends above the surface of disk 8 and has scraper 10 secured thereto by lock nut 12. Material 14 on the disk is swept from the disk by scraper 10 onto conveyor belt 16.

The inner end 18 of scraper 10 is flattened and bored so that it is fitted over shaft 6. When lock nut 12 is loosened, the scraper can be set in one position as shown in Figure 2 with the disk rotating in the direction of the arrow 20. By similarly loosening and tightening nut 12, the disk can be set in the position shown in Figure 3 with the disk rotating in the opposite direction as indicated by the arrow 21. Consequently, the scraper can be set from one position to about 60 degrees therefrom. Only one scraper is needed for the two rotational directions of the disk, as the direction of rotation is changed all depending upon the working position of the scoop wheel.

The side walls 24 of the scraper are shaped according to a logarithmic curve, the two shaped walls being joined at an outer pointed end 26. This produces a streamlined oval-like shape so that the material will contact all points of a wall at substantially the same angle, and the material will be deflected by the scraper with the least possible friction, and transferred onto the conveyor belt.

Having now described the means by which the objects of the invention are obtained,

I claim:

In a scoop wheel having a rotatable reversible material transfer disk, a drive shaft joined to and extending above the upper surface of said disk, and a scraper adjustably mounted on said shaft above said disk for being turned to different positions, the improvement comprising two oppositely disposed side walls for said scraper, said walls being curved toward each other in the form of a logarithmic curve and forming an oval streamline scraper.

References Cited in the file of this patent

UNITED STATES PATENTS 1,316,999   Bramer _____ Sept. 23, 1919
1,584,591   Arnold _____ May 11, 1926